United States Patent
Kano

(10) Patent No.: US 8,754,957 B2
(45) Date of Patent: Jun. 17, 2014

(54) IMAGE PROCESSING APPARATUS AND METHOD

(75) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 13/585,895

(22) Filed: Aug. 15, 2012

(65) Prior Publication Data

US 2013/0050546 A1 Feb. 28, 2013

(30) Foreign Application Priority Data

Aug. 30, 2011 (JP) ................................. 2011-187856

(51) Int. Cl.
| | |
|---|---|
| H04N 5/228 | (2006.01) |
| H04N 9/73 | (2006.01) |
| H04N 17/00 | (2006.01) |
| G06K 9/00 | (2006.01) |

(52) U.S. Cl.
USPC ..................... 348/222.1; 348/223.1; 348/179; 348/450; 382/162

(58) Field of Classification Search
CPC ........... H04N 5/228; H04N 9/73; H04N 9/64; H04N 17/00; H04N 11/20; G06K 9/00; G06K 9/64
USPC ........... 348/222.1, 223.1, 179, 182, 444, 450, 348/453, 489, 587, 592, 609, 29, 32, 348/210.99, 259, 237, 234; 382/162, 167, 382/279, 254
See application file for complete search history.

(56) References Cited

U.S. PATENT DOCUMENTS

| | | | |
|---|---|---|---|
| 5,879,284 | A | 3/1999 | Tsujita |
| 2001/0008418 | A1* | 7/2001 | Yamanaka et al. ............. 348/222 |
| 2003/0122926 | A1 | 7/2003 | Kumei et al. |
| 2004/0165090 | A1* | 8/2004 | Ning .............................. 348/272 |
| 2009/0297056 | A1 | 12/2009 | Lelescu et al. |
| 2011/0149103 | A1* | 6/2011 | Hatakeyama et al. ...... 348/222.1 |
| 2012/0169908 | A1* | 7/2012 | Kaneo et al. .................. 348/300 |

FOREIGN PATENT DOCUMENTS

| | | |
|---|---|---|
| JP | 10165365 B | 6/1998 |
| JP | 03532368 B | 5/2004 |
| JP | 2006-238032 A | 9/2006 |

OTHER PUBLICATIONS

European Search Report issued in corresponding application No. 12182463.5 on Apr. 12, 2013.

* cited by examiner

*Primary Examiner* — Tuan Ho
*Assistant Examiner* — Marly Camargo
(74) *Attorney, Agent, or Firm* — Carter, DeLuca, Farrell & Schmidt, LLP

(57) ABSTRACT

An image processing apparatus which performs recovery processing of correcting a degradation in image due to an aberration in an optical imaging system, with respect to image data of a plurality of colors, comprising: a separation unit configured to separate image data into image data of the respective colors, and further separate image data of a color whose spatial frequency characteristic is higher than that of another color due to an arrangement of color filters of the plurality of colors into a plurality of image data of same color so as to have the same spatial frequency characteristic as that of the other color; a plurality of image processing units configured to perform recovery processing by filter processing for each of the separated image data; and an interpolation processing unit configured to perform color interpolation processing of each pixel for the image data having undergone the recovery processing.

12 Claims, 14 Drawing Sheets

F I G. 2

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

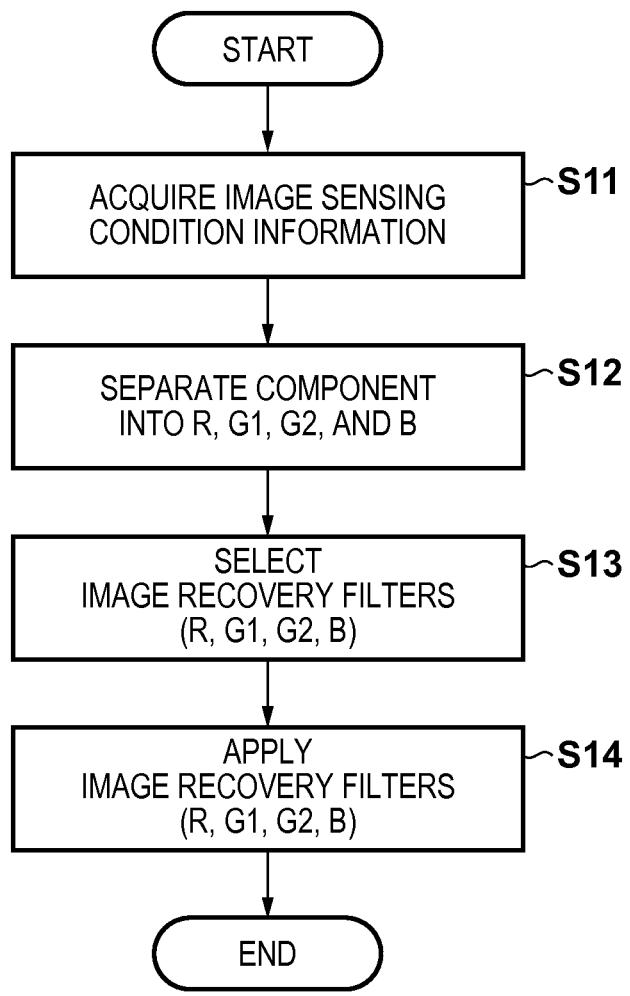

IMAGE RECOVERY FILTER

VALUE OF TAP

TAP

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

|   | 0 | 1 | 2 | 3 | 4 |
|---|---|---|---|---|---|
| 0 | 100 |  | 100 |  | 200 |
| 1 |  | 100 |  | 200 |  |
| 2 | 100 |  | 100 |  | 200 |
| 3 |  | 100 |  | 200 |  |
| 4 | 100 |  | 100 |  | 200 |

G BEFORE INTERPOLATION

|   | 0 | 1 | 2 | 3 | 4 |
|---|---|---|---|---|---|
| 0 |  | 100 |  | 200 |  |
| 1 |  |  |  |  |  |
| 2 |  | 100 |  | 200 |  |
| 3 |  |  |  |  |  |
| 4 |  | 100 |  | 200 |  |

R BEFORE INTERPOLATION

|   | 0 | 1 | 2 | 3 | 4 |
|---|---|---|---|---|---|
| 0 |  |  |  |  |  |
| 1 | 100 |  | 100 |  | 200 |
| 2 |  |  |  |  |  |
| 3 | 100 |  | 100 |  | 200 |
| 4 |  |  |  |  |  |

B BEFORE INTERPOLATION

| 100 | 100 | 100 | 175 | 200 |
|-----|-----|-----|-----|-----|
| 100 | 100 | 125 | 200 | 200 |
| 100 | 100 | 100 | 175 | 200 |
| 100 | 100 | 125 | 200 | 200 |
| 100 | 100 | 100 | 175 | 200 |

G AFTER LINEAR INTERPOLATION

| 100 | 100 | 150 | 200 | 200 |
|-----|-----|-----|-----|-----|
| 100 | 100 | 150 | 200 | 200 |
| 100 | 100 | 150 | 200 | 200 |
| 100 | 100 | 150 | 200 | 200 |
| 100 | 100 | 150 | 200 | 200 |

R AFTER LINEAR INTERPOLATION

| 100 | 100 | 100 | 150 | 200 |
|-----|-----|-----|-----|-----|
| 100 | 100 | 100 | 150 | 200 |
| 100 | 100 | 100 | 150 | 200 |
| 100 | 100 | 100 | 150 | 200 |
| 100 | 100 | 100 | 150 | 200 |

B AFTER LINEAR INTERPOLATION

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

G AFTER ADAPTIVE INTERPOLATION

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

R AFTER ADAPTIVE INTERPOLATION

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

B AFTER ADAPTIVE INTERPOLATION

FIG. 11A

| C1 | C2 | C1 | C2 | C1 | C2 |
|----|----|----|----|----|----|
| C2 | C3 | C2 | C3 | C2 | C3 |
| C1 | C2 | C1 | C2 | C1 | C2 |
| C2 | C3 | C2 | C3 | C2 | C3 |
| C1 | C2 | C1 | C2 | C1 | C2 |
| C2 | C3 | C2 | C3 | C2 | C3 |

FIG. 11B

| C1 | C2 | C1 | C4 | C1 | C2 |
|----|----|----|----|----|----|
| C3 | C1 | C4 | C1 | C3 | C1 |
| C1 | C4 | C1 | C2 | C1 | C4 |
| C4 | C1 | C3 | C1 | C4 | C1 |
| C1 | C2 | C1 | C4 | C1 | C2 |
| C3 | C1 | C4 | C1 | C3 | C1 |

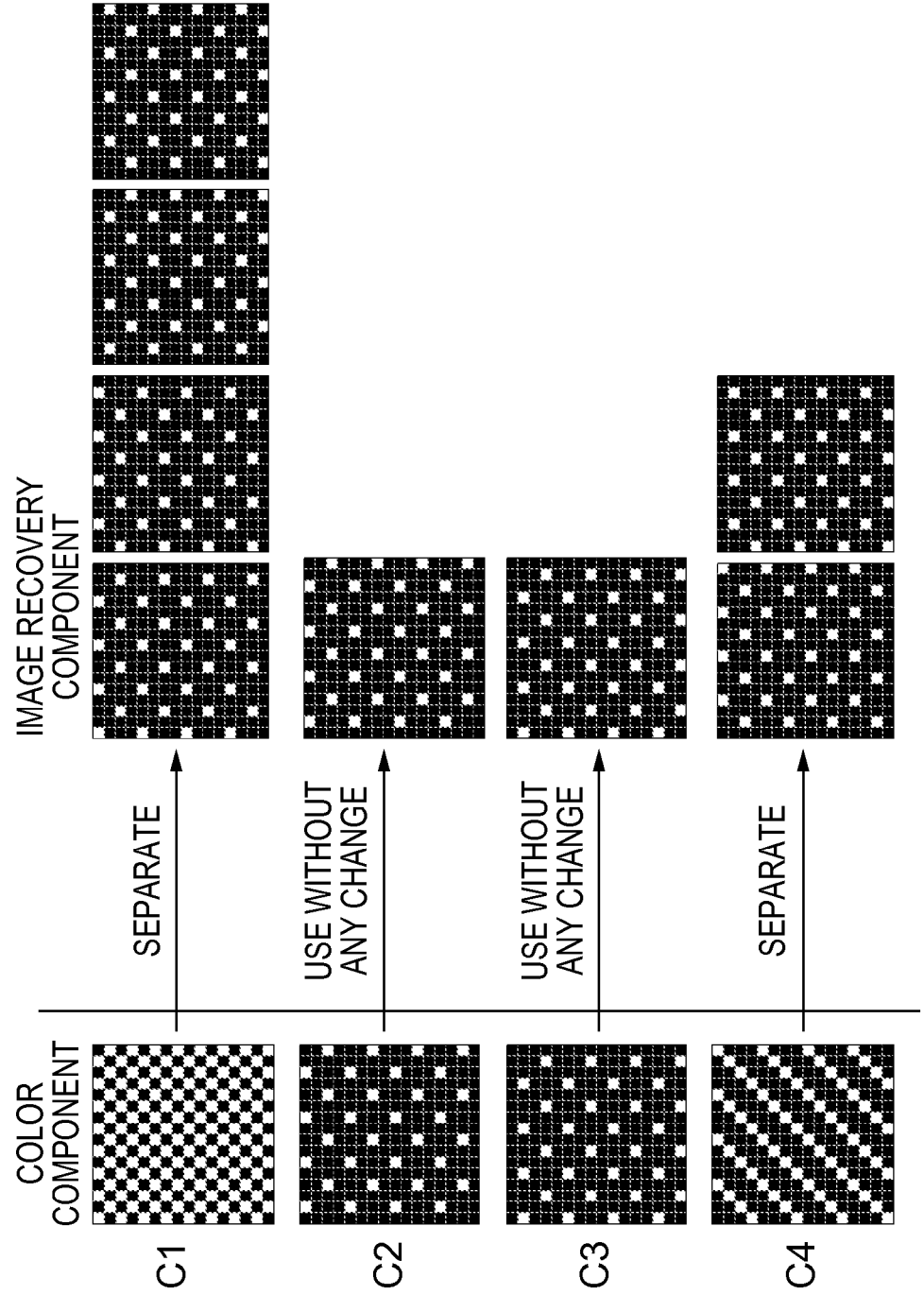

IMAGE PROCESSING APPARATUS AND METHOD

BACKGROUND OF THE INVENTION

1. Field of the Invention

The present invention relates to an image processing apparatus and method and, more particularly, to an image processing apparatus and method which correct a degraded image by using image recovery processing.

2. Description of the Related Art

Since the digitization of information has allowed images to be processed as signal values, there have been proposed various correction processing methods for sensed images. When an object is sensed and imaged by a digital camera, the obtained image suffers from a degree of degradation in quality. The degradation in image quality is caused particularly by the aberrations of the optical imaging system used to image the object.

The causes of blur components in an image include the spherical aberration, comatic aberration, field of curvature, and astigmatism of an optical system. Each of the blur components of an image due to these aberrations indicates that a light beam emerging from one point of an object is formed into an image with a spread, which should converge into one point on an imaging plane without any aberration or any influence of diffraction. This state is called a PSF (Point Spread Function) in optical terms but will be referred to herein as a blur component in image terms. Blur in an image may indicate a defocused image, but is used to indicate herein an image blurred due to the influences of the above aberrations of the optical system, even if it is in focus. In addition, color fringing on color images due to the chromatic aberration on the axis, spherical aberration of color, and comatic aberration of color of optical systems can be regarded as different ways of blurring at different wavelengths.

The OTF (Optical Transfer Function) obtained by Fourier transform of a PSF is frequency component information of an aberration, which is expressed by a complex number. The absolute value of an OTF, that is, an amplitude component, will be referred to as an MTF (Modulation Transfer Function), and a phase component will be referred to as a PTF (Phase Transfer Function). That is, an MTF and PTF are respectively the frequency characteristics of an amplitude component and phase component of an image's degradation due to aberrations. In this case, a phase component is represented as a phase angle by $$PTF = \tan^{-1}(Im(OTF)/Re(OTF)) \quad (1)$$

where Re(OTF) and Im(OTF) respectively represent the real part and the imaginary part of the OTF.

As described above, the OTF of an optical imaging system causes degradations in the amplitude component and phase component of an image. For this reason, a degraded image asymmetrically blurs at each point of the imaged object like a comatic aberration.

In addition, the chromatic aberration of magnification occurs when image forming positions shift due to the differences in image forming magnification at different wavelengths of light, and an image sensing apparatus acquires the shifts as R, G, and B color components in accordance with the spectral characteristics. Image spreading occurs due to image forming position shifts at different wavelengths within each color component, that is phase shifts, as well as image forming position shifts between R, G, and B components. To be precise, the chromatic aberration of magnification is not simple color fringing due to horizontal shifts. However, color fringing will be used herein as a synonym of the chromatic aberration of magnification.

As a method of correcting degradations in amplitude (MTF) and phase (PTF), a method of correcting them by using the information of the OTF of an optical imaging system is known. This method is called "image recovery" and "image restoration". The processing of correcting degradation in image by using the information of the OTF of an optical imaging system will be referred to as image recovery processing.

The following is an outline of image recovery processing. Letting g(x, y) be a degraded image, f(x, y) be the original image, and h(x, y) be the PSF obtained by inverse Fourier transform of the optical transfer function, equation (2) given below holds:

$$g(x,y) = h(x,y) * f(x,y) \quad (2)$$

where * represents convolution and (x, y) represents coordinates on the image.

When this equation is converted into a display form on a frequency plane by Fourier transform, it becomes a form of product for each frequency as represented by equation (3):

$$G(u,v) = H(u,v) \cdot F(u,v) \quad (3)$$

where H is the function obtained by Fourier transform of a PSF, and hence represents an OTF, and (u, v) represents coordinates on a two-dimensional frequency plane, that is, a frequency.

That is, in order to obtain the original image from the sensed degraded image, both sides of equation (3) may be divided by H as represented by equation (4) given below.

$$G(u,v)/H(u,v) = F(u,v) \quad (4)$$

Returning F(u, v) to the real plane by inverse Fourier transform can obtain the original image f(x, y) as a recovered image.

Letting R be the value obtained by inverse Fourier transform of equation (4), it is also possible to obtain the original image by performing convolution processing for an image on the real surface, as represented by equation (5):

$$g(x,y) * R(x,y) = f(x,y) \quad (5)$$

where R(x, y) is called an image recovery filter. An actual image, however, includes noise components. For this reason, using an image recovery filter generated by taking the perfect reciprocal of the OTF in the above manner will amplify noise components together with the degraded image. In general, therefore, a proper image cannot be obtained. In this respect, for example, there is known a method of suppressing the recovery ratio on the high-frequency side of an image in accordance with the intensity ratio between an image signal and a noise signal, such as a method using a Wiener filter. As a method of correcting degradation in the color fringing component of an image, for example, the degradation is corrected by correcting the above blur components so that the amount of blur is made uniform for the respective color components of the image.

In this case, since the OTF varies in accordance with image sensing conditions such as a zooming position and an aperture diameter, it is necessary to change the image recovery filter used for image recovery processing accordingly.

For example, Japanese Patent Laid-Open No. 2006-238032 discloses image recovery processing which is performed upon setting a minute spread in the PSF after image recovery. Japanese Patent No. 03532368 discloses a technique of eliminating an image blur in an endoscope for observing the interior of the living body by using a PSF corresponding to a fluorescence wavelength to be used with respect a range outside the in-focus range of an image sensing means. Since the fluorescence is weak, an object optical system with a small f-number is required. This leads to a decrease in focal depth. This technique is therefore designed to obtain an in-focus image by performing image recovery processing with respect to a range in which the optical system goes out of focus.

As described above, performing image recovery processing for a sensed input image can improve image quality by correcting aberrations.

Image recovery processing methods include a method of applying image recovery processing to a RAW image having a signal corresponding to one color component, namely one of the R, G, and B color components; and a method of applying image recovery processing to each color plane after performing interpolation so that each pixel has a signal corresponding to all color components, namely R, G, and B color components.

The method of applying image recovery processing to each color plane is larger than the method of applying image recovery processing to a RAW image in terms of the number of pixels to which image recovery processing is applied and the number of taps of the recovery filter. This leads to a considerable increase in the processing load of image recovery processing.

In general, the color components of the respective pixels constituting a RAW image are often arranged in a Bayer arrangement like that shown in FIG. 2. In this case, the number of pixels of a G component is larger than that of R or B components. For this reason, frequency characteristics in the pixel arrangement of a G component in a RAW image differ from those in the pixel arrangement of R and B components. As described above, since image recovery processing is equivalent to the correction of frequency characteristics, the frequency band of a G component differs from that of an R component or B component. In this case, a G component can be recovered in a higher frequency band than that of an R component or B component. If only a G component, out of R, G, and B components, is recovered up to a high frequency band, image recovery processing sometimes generates a false color which has not existed in the original image in an area that includes a high-frequency component in the image. This is because the relationship between the frequency characteristics of R, G, and B components in the high-frequency band of the image has changed before and after the image recovery processing. As described above, performing image recovery processing for signal components in different frequency bands will generate false colors. A false color in this case is generated due to a change in the pixel data itself, which is acquired by an image sensor, unlike a false color generated due to pixel interpolation for an image in a Bayer arrangement. Therefore, using a pixel interpolation algorithm designed to suppress the generation of false colors cannot suppress false colors generated via image recovery processing.

SUMMARY OF THE INVENTION

The present invention has been made in consideration of the above situation, and reduces false colors generated by image recovery processing in a RAW image and reduces the load on image recovery processing.

According to the present invention, provided is an image processing apparatus for performing recovery processing of image data to correct degradation of the quality of an image due to an aberration in an optical imaging system, the image data obtained by sensing an object image entering through the optical imaging system using an image sensor having a plurality of pixels, where each pixel of image sensor is covered with one of a plurality of color filters, the image processing apparatus comprising: a separation unit configured to separate image data of the plurality of colors of the color filters into image data of the respective colors of the color filters; a plurality of image processing units each configured to perform recovery processing by filter processing image data of one of the respective colors separated by the separation unit; and an interpolation processing unit configured to perform color interpolation processing of each pixel for the image data having undergone the recovery processing, wherein the separation unit is further configured to separate image data of a color whose spatial frequency characteristic is higher than that of another color, due to an arrangement of the plurality of color filters of the plurality of colors into a plurality of image data of the same color so that the plurality of image data of the same color have the same spatial frequency characteristic as the image data of the other color, and the interpolation processing unit is further configured to perform the color interpolation processing by using the image data of the plurality of colors as though it were image data of the same color.

Further, according to the present invention, provided is an image processing apparatus for performing recovery processing of image data to correct a degradation in image quality due to an aberration in an optical imaging system, the image data obtained by sensing an object image entering through the optical imaging system using an image sensor having a plurality of pixels, where each pixel of the image sensor is covered with one of a plurality of color filters, comprising: a plurality of image processing units, disposed in series, each configured to perform recovery processing by filter processing for a part of the image data of the plurality of colors; and an interpolation processing unit configured to perform color interpolation processing of each pixel for the image data having undergone the recovery processing, wherein each of the plurality of image processing units is configured to perform the recovery processing for respective image data of each color which has not undergone the recovery processing, and separately handles, as image data of a plurality of colors, image data of a color whose spatial frequency characteristic is higher than that of another color, due to an arrangement of the color filters of the plurality of colors, such that the part of image data to be separately handled as image data of a plurality of colors and processed by the plurality of image processing units has the same frequency characteristic as the image data of the other color, and the interpolation processing unit is further configured to perform the color interpolation processing by using the image data of the plurality of colors as though it were image data of the same color.

Furthermore, according to the present invention, provided is an image processing method for performing recovery processing of image data to correct for a degradation in image quality due to an aberration in an optical imaging system, the image data obtained by sensing an object image entering through the optical imaging system using an image sensor having a plurality of pixels, where each pixel of the image sensor is covered with one of a plurality of color filters of a plurality of colors, the method comprising: a separation step of separating image data of the plurality of colors of the plurality of color filters into a plurality of image data of the respective colors; an image processing step of performing recovery processing by filter processing for each of the image data of the respective colors separated in the separation step; and an interpolation processing step of performing color interpolation processing of each pixel for the image data having undergone the recovery processing; wherein in the separation step, image data of a color whose spatial frequency characteristic is higher than that of another color, due to the arrangement of color filters of the plurality of colors, is separated into a plurality of image data of the same color so that the plurality of image data of the same color each have the same spatial frequency characteristic as the image data of the other color, and in the interpolation processing step, the color interpolation processing is performed by using the image data of the plurality of colors as though it were image data of the same color.

Further, according to the present invention, provided is an image processing method for performing recovery processing of image data to correct for a degradation in image quality due to an aberration in an optical imaging system, with respect to image data obtained by sensing an object image entering through the optical imaging system using an image sensor having a plurality of pixels, where each pixel of the image sensor is covered with one of a plurality of color filters of a plurality of colors, comprising: an image processing step of sequentially performing recovery processing by filter processing for each part of image data of the respective plurality of colors using a plurality of respective image processing units disposed in series; and an interpolation processing step of performing color interpolation processing of each pixel for the image data having undergone the recovery processing, wherein in the image processing step each of the plurality of image processing units performs the recovery processing with respect to image data of each color which has not undergone the recovery processing, and separately handles, as image data of a plurality of colors, image data of a color whose spatial frequency characteristic is higher than that of another color, due to the arrangement of the color filters of the plurality of colors, such that the part of image data separately handled as a plurality of colors and processed by the plurality of image processing units has the same frequency characteristic as the image data of the other color, and in the interpolation processing step, the color interpolation processing is performed by using the image data of the plurality of colors as though it were image data of the same color.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view showing an example of a color component arrangement;

FIG. 6 is a flowchart for image recovery processing according to the first embodiment;

FIGS. 11A and 11B are views each showing an example of the pixel arrangement of another image sensor according to the first embodiment;

FIG. 12 is a view showing other color components and image recovery components according to the first embodiment;

DESCRIPTION OF THE EMBODIMENTS

Embodiments of the present invention will be described in detail with reference to the accompanying drawings.

First Embodiment

Figure 1:
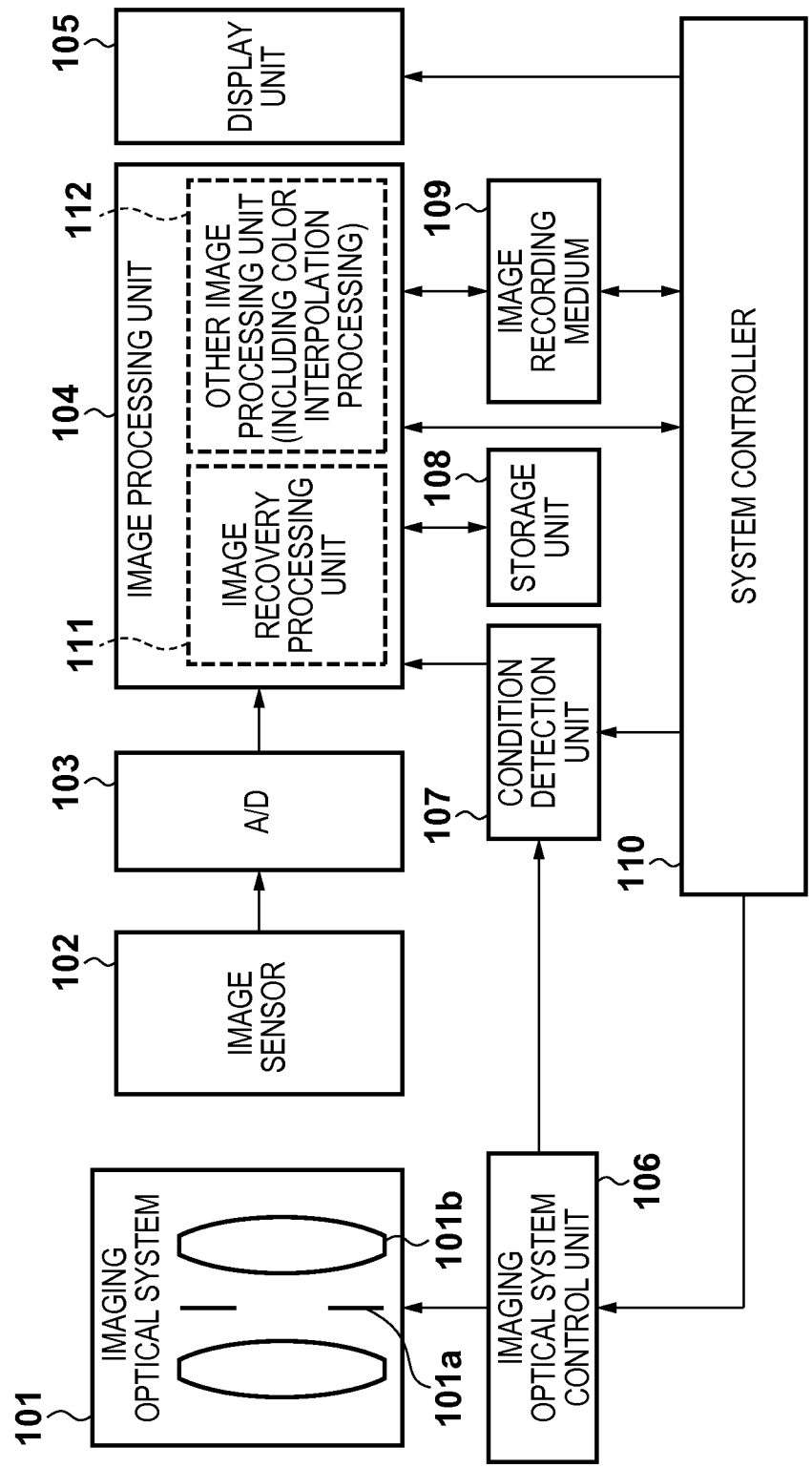
FIG. 1 is a block diagram showing the arrangement of an image processing apparatus according to an embodiment of the present invention.

FIG. 1 shows an example of the basic arrangement of an image sensing apparatus according to an embodiment of the present invention. An object image (not shown) is incident on an image sensor 102 through an optical imaging system 101 which includes a stop 101a and a focus lens 101b. The image sensor 102 is covered with, for example, color filters arranged in a so-called Bayer arrangement shown in FIG. 2. Each pixel constituting the image sensor 102 outputs a signal of a color component corresponding to the color of a filter, of the red (R), green (G), and blue (B) color filters, with which the pixel is covered. The image sensor 102 converts image forming light into an electrical signal. An A/D converter 103 converts the signal into a digital signal and inputs it to an image processing unit 104. The image processing unit 104 constitutes an image recovery processing unit 111 and the other image processing unit 112 which performs predetermined processing. The image processing unit 112 performs, inter alia, color interpolation processing. Each pixel of an output image from the image recovery processing unit 111 includes only a signal of a color component corresponding to one of the filter colors. For this reason, the image processing unit 112 performs color interpolation processing for a recovered image so as to make the respective pixels have signals of color components corresponding to all the filter colors.

First of all, the image processing unit 104 obtains the information of image sensing conditions of the image sensing apparatus from a condition detection unit 107. The condition detection unit 107 may directly obtain the information of image sensing conditions from a system controller 110 and can obtain the information of image sensing conditions concerning, for example, an optical imaging system from an optical imaging system control unit 106. The image recovery processing unit 111 then selects an image recovery filter corresponding to the image sensing conditions from a storage unit 108, and performs image recovery processing for the image input to the image processing unit 104. The data held by the storage unit 108 may be information concerning an OTF required to generate an image recovery filter instead of image recovery filters. In this case, the image recovery processing unit 111 selects information concerning an OTF corresponding to the image sensing conditions from the storage unit 108, and generates an image recovery filter corresponding to the image sensing conditions. The image recovery processing unit 111 then performs image recovery processing for the image input to the image processing unit 104.

An image recording medium 109 holds the output image processed by the image processing unit 104 in a predetermined format. A display unit 105 may display the image obtained by performing predetermined processing for display with respect to the image having undergone the image recovery processing, or may display the image which has not undergone image recovery processing, or which has undergone simple recovery processing.

The system controller 110 performs a series of control operations. The optical imaging system control unit 106 mechanically drives the optical imaging system in accordance with an instruction from the system controller 110.

The system controller 110 controls the aperture diameter of the stop 101a as an image sensing condition setting for an f-number. An AF (autofocus) mechanism or a manual focusing mechanism controls the position of the focus lens 101b so as to perform focus adjustment in accordance with an object distance. This optical imaging system 101 may include an optical element such as a low-pass filter or infrared cut filter. When using an element such as a low-pass filter which exerts an influence upon the characteristics of the OTF, it is necessary to consider a change in the OTF due to the optical element at the time of generating an image recovery filter. An infrared cut filter also exerts an influence upon the PSFs in RGB channels which are integral values of the PSFs of spectral wavelengths, in particular, upon the PSF in the R channel. Therefore, a change in PSF due to the infrared cut filter is taken into consideration at the time of generating an image recovery filter.

Further, the optical imaging system 101 is configured as part of the image sensing apparatus, but may be exchangeable, as in a single lens reflex camera.

Figure 3:
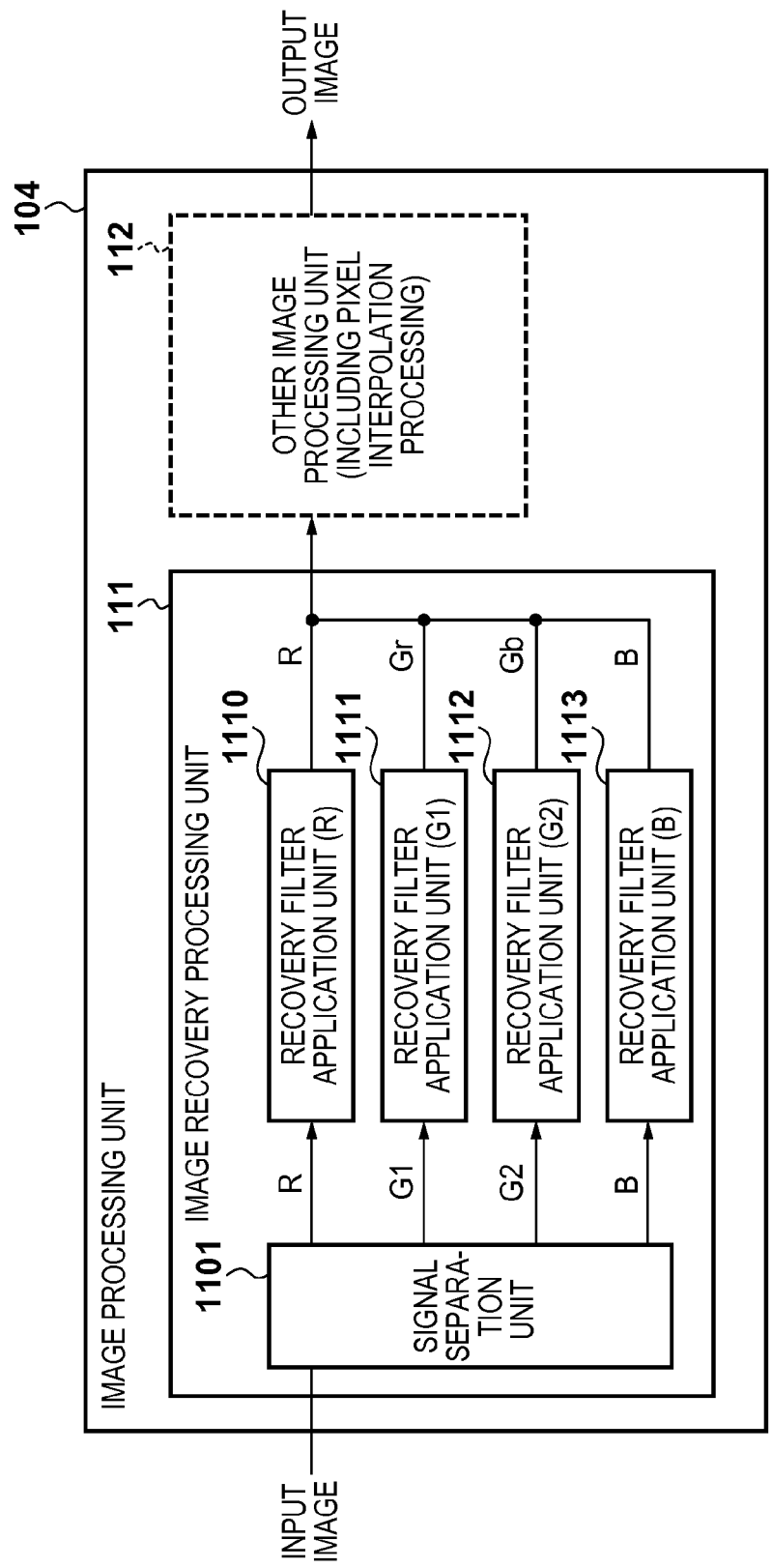
FIG. 3 is a block diagram showing the arrangement of an image processing unit according to a first embodiment.

FIG. 3 shows the arrangement of the image processing unit 104 according to the first embodiment. As described above, an input image to the image recovery processing unit 111 is RAW data in which each pixel has one of color components, namely R, G, and B color components in a Bayer arrangement like that shown in FIG. 2.

In the first embodiment, a signal separation unit 1101 in the image recovery processing unit 111 separates a G component into G1 and G2 to obtain four image recovery components: R, G1, G2, and B. The four image recovery components are then input to recovery filter application units 1110 to 1113 to apply image recovery filters to the components.

Figure 4A:
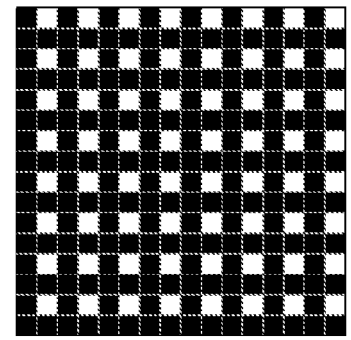
FIGS. 4A to 4E are views showing color components and image recovery components according to the first embodiment.
Figure 4B:
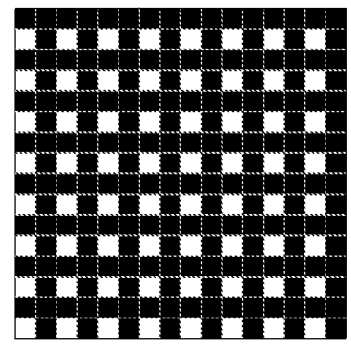
Figure 4C:
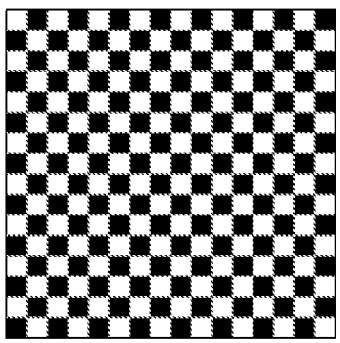
Figure 4D:
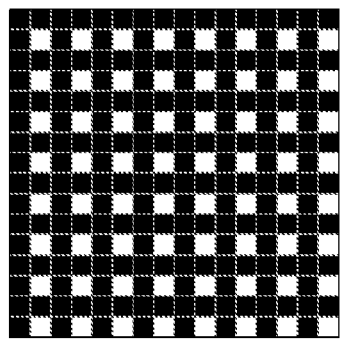
Figure 4E:
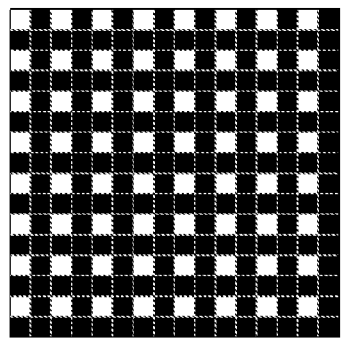

FIGS. 4A to 4E each show an example of each color component in RAW data and each image recovery component. FIGS. 4A to 4E show three color components in RAW data. FIG. 4A shows a G component. FIG. 4B shows an R component. FIG. 4C shows a B component. Each pixel represented by a white square in FIGS. 4A to 4E indicates a corresponding color component. In the first embodiment, the G component shown in FIG. 4A is divided into G1 and G2 components shown in FIGS. 4D and 4E, and image recovery processing is applied to them. Assume that a signal of a G component output from a pixel adjacent to a pixel which outputs a signal of an R component in the horizontal direction is a signal of a G1 component, and a signal of a G component output from a pixel adjacent to a pixel which outputs a signal of a B component is a signal of a G2 component. Of FIGS. 4A to 4E, FIG. 4B shows an image recovery component R, FIG. 4C shows an image recovery component B, FIG. 4D shows an image recovery component G1, and FIG. 4E shows an image recovery component G2.

Figure 5A:
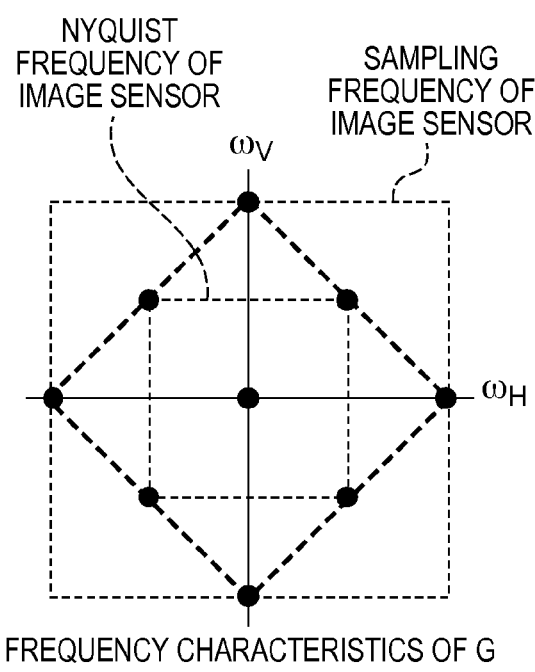
FIGS. 5A and 5B are views showing color-component specific frequency characteristics according to the first embodiment.
Figure 5B:
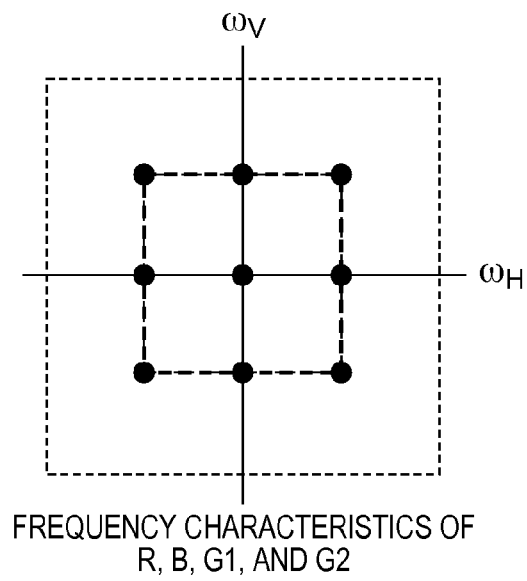

FIGS. 5A and 5B are views showing the spatial frequency characteristics of color-component specific pixel arrangements in the image sensor. The respective components shown in FIGS. 4A to 4E are respectively represented by m_G(x, y), m_R(x, y), m_B(x, y), m_G1($x, y$), and m_G2($x, y$), assuming that 1 represents each pixel (represented by a white square) which can sense light and 0 represents each pixel (represented by a black square) which cannot sense light. The spatial frequency characteristics shown in FIGS. 5A and 5B correspond to the data obtained by Fourier transform of m_G(x, y), m_R(x, y), m_B(x, y), m_G1($x, y$), and m_G2($x, y$).

FIG. 5A shows a G component, that is, the spatial frequency characteristics in FIG. 4A, which is a comb function, in which is exist only at the positions of "●". FIG. 5B shows the spatial frequency characteristics of the R and B components shown in FIGS. 4B and 4C. FIG. 5B differs from FIG. 5A showing the spatial frequency characteristics of the G component. In addition, the spatial frequency characteristics obtained when the G component is divided into the image recovery components G1 and G2 are the same as those shown in FIG. 5B showing the spatial frequency characteristics of the R and B components.

When image recovery processing is directly performed for the three color components R, G, and B, since the spatial frequency characteristics of the G component differ from those of the R and B components as shown in FIGS. 5A and 5B, false colors, which have not existed in the original image, may be generated in an area including the high-frequency components of the image, as described above. In contrast, separating the G component into the image recovery components G1 and G2 makes the pixel arrangements of the four image recovery components R, G1, G2, and B exhibit the same spatial frequency characteristics. This allows the performance of image recovery processing for a common frequency band, and hence can suppress the generation of false colors due to the image recovery processing.

When directly performing image recovery processing for three color components R, G, and B, it is possible to make the frequency band of the G component to be corrected coincide with that of the R and B components, depending on the way of generating an image recovery filter to be applied to the G component. However, the frequency band to be recovered in this processing is equivalent to that in the processing of separating the G component into the image recovery components G1 and G2. The processing of separating the G component into the image recovery components G1 and G2 is more advantageous from the viewpoint of processing loads at the time of convolution of image recovery filters, as will be described later.

A procedure for image recovery processing in the image recovery processing unit 111 in the first embodiment will be described in detail below with reference to the flowchart of FIG. 6.

In step S11, the image recovery processing unit 111 acquires the information of actual image sensing conditions from the condition detection unit 107, as described above. The image sensing conditions include, for example, a zooming position, aperture diameter, and object distance. In step S12, the signal separation unit 1101 separates RAW data constituted by R, G, and B components into the four image recovery components R, G1, G2, and B. More specifically, there may be prepared four image data, for R, G1, G2, and B, respectively, each having 0 set at a portion falling under each pixel corresponding to a color component other than target image recovery components. Alternatively, there may be prepared four image data, for R, G1, G2, and B, respectively, each having a ¼ size, obtained by thinning out a portion given as a pixel corresponding to a color component other than target image recovery components.

In step S13, the image recovery processing unit 111 selects image recovery filters suitable for the acquired image sensing conditions and the four image recovery components R, G1, G2, and B from the storage unit 108. At this time, it is possible to correct the selected image recovery filters as needed. This is the operation of discretely preparing the data of image sensing conditions to reduce the number of image recovery filter data prepared in advance in the storage unit 108 and correcting image recovery filters when actually executing image recovery processing. In addition, if the storage unit 108 holds information concerning OTFs necessary for the generation of image recovery filters instead of image recovery filters, image recovery filters are generated from the selected information concerning OTFs in accordance with image sensing conditions.

An image recovery filter will be described below.

Figure 7A:
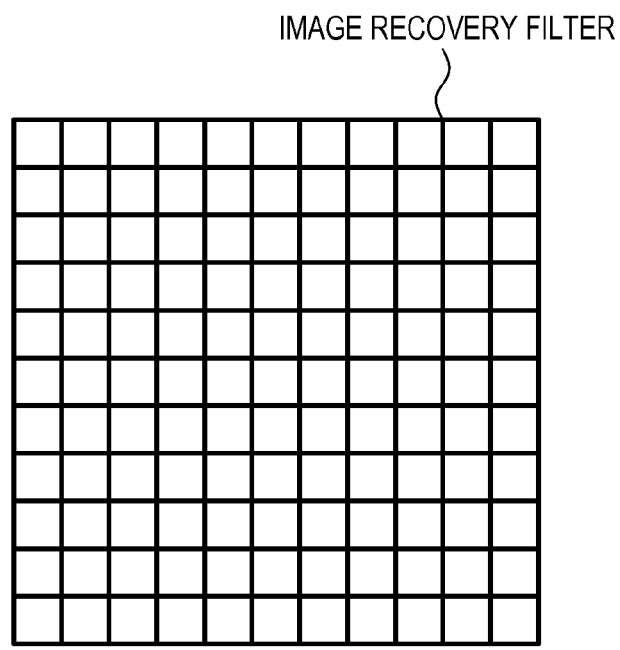
FIGS. 7A and 7B are schematic views for explaining an image recovery filter.
Figure 7B:
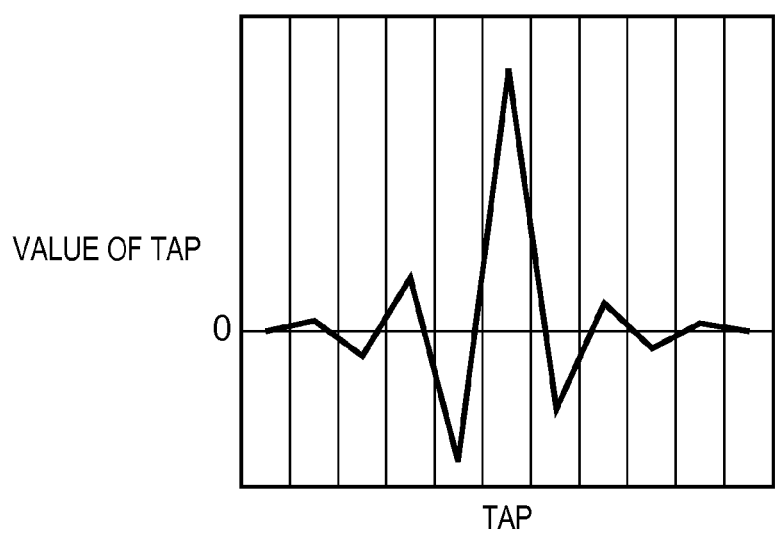

FIGS. 7A and 7B are schematic views showing an example of an image recovery filter to be applied to each color plane of an image with each pixel containing the respective color components R, G, and B. It is possible to determine the number of taps of an image recovery filter in accordance with the aberration amount of an optical imaging system. In this case, a two-dimensional filter with 11×11 taps is used. Convolution processing is performed for an image in an image recovery process with each tap of the filter corresponding to one pixel of the image. As shown in FIG. 7A, using a two-dimensional filter obtained by dividing an image recovery filter into 100 or more filters can perform recovery for aberrations widely spreading from image forming positions such as the spherical aberration, comatic aberration, chromatic aberration on the axis, off-axis color flare, and the like of the optical imaging system.

FIG. 7A omits values in the respective taps. FIG. 7B shows one section of this filter. This image recovery filter can be generated by the method described above, that is, by calculating or measuring the OTF of an optical element of an optical imaging system and performing inverse Fourier transform of the inverse function. In general, since it is necessary to consider the influences of noise, it is possible to selectively use a method of generating a Wiener filter or an associated recovery filter. Using a Wiener filter can recover a degradation in phase (PTF) and recover a degradation in amplitude (MTF) at different levels for the respective bands. In addition, an OTF can have a factor that degrades the OTF with respect to not only an optical imaging system but also an image to be input. For example, a low-pass filter is used to suppress high-frequency components with respect to the frequency characteristics of the OTF. In addition, the shape and opening ratio of pixel openings of an image sensor also have influences on frequency characteristics. In addition, such factors include the spectral characteristics of a light source and the spectral characteristics of filters with various wavelengths. It is preferable to generate image recovery filters based on OTFs to encompass the breadth of possible factors that can contribute to degradation of the OTF characteristics.

If an input image is an RGB color image, it is preferable to generate three image recovery filters corresponding to the respective color components, that is, R, G, and B components. An optical imaging system has chromatic aberration and varies in the manner of blurring for each color component. For this reason, the characteristics of image recovery filters for the respective color components slightly differ from each other based on chromatic aberrations. That is, the sectional view of FIG. 7A differs for the respective color components. The numbers of taps of an image recovery filter in the vertical and horizontal directions need not be determined in accordance with a square arrangement, and can be arbitrarily changed as long as consideration is given to convolution processing.

An example of an image recovery filter to be applied to a RAW image with each pixel having one color component which is used in the first embodiment will be described with reference to FIGS. 8A and 8B in comparison to an image recovery filter, as described above, to be applied to each color plane of an image with each pixel having all color components R, G, and B. This filter is an image recovery filter holding coefficients for pixels in which target color components exist, with each portion holding a coefficient being represented by a white square, and the remaining portions each holding 0 being represented by a black square.

Figure 8A:
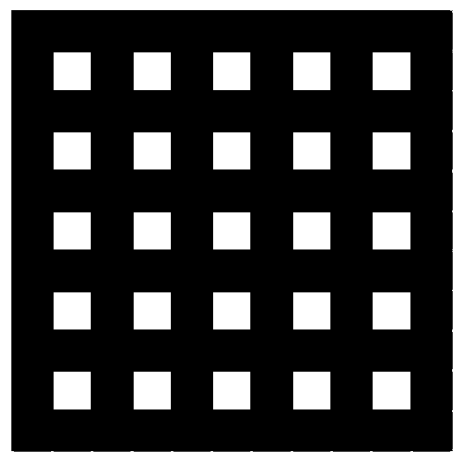
FIGS. 8A and 8B are schematic views for explaining an image recovery filter according to the first embodiment.
Figure 8B:
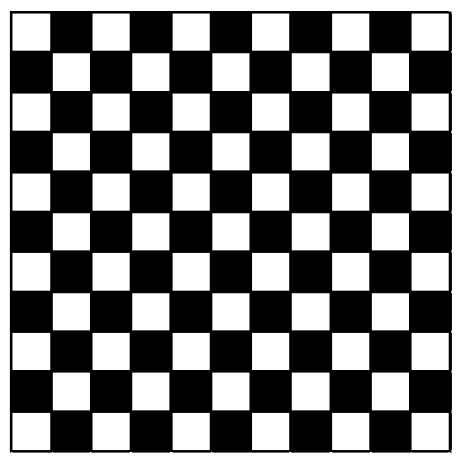

When performing image recovery processing for three color components, that is, R, G, and B components, without separating the G component, an image recovery filter to be applied to the R and B components becomes the one shown in FIG. 8A, and an image recovery filter to be applied to the G component becomes the one shown in FIG. 8B. In contrast to this, the first embodiment applies an image recovery filter upon separating the G component into the image recovery components G1 and G2, and hence can use an image recovery filter like the one shown in FIG. 8A for any of the components R, G1, G2, and B.

Referring back to FIG. 6, in step S14, using the image recovery filter selected in step S13, the recovery filter application units 1110 to 1113 perform convolution processing by filter processing for each pixel of the image recovery components R, G1, G2, and B of an input image which has been sensed. This makes it possible to eliminate or reduce the blur components of the image due to the aberrations caused in the optical imaging system. As described above, using an image recovery filter suitable for each of the color image recovery components R, G1, G2, and B can also correct chromatic aberration.

The convolution processing in the first embodiment is convolution processing by filter processing using the image recovery components R, G1, G2, and B shown in FIGS. 4B to 4E and the image recovery filter shown in FIG. 8A. It is preferable to change the method of holding image recovery filters or the method of applying filters in accordance with the manner of making each image recovery component separated in step S12 have data, as needed. If, for example, four sets of image data having 0s set to portions other than target image recovery components for R, G1, G2, and B, respectively, are used, unnecessary computation can be omitted by limiting target image recovery components to pixels to be subjected to convolution processing. In addition, when preparing four sets of image data, each having a ¼ size and obtained by thinning out portions other than image recovery components to be processed, for R, G1, G2, and B, respectively, this apparatus also holds the image recovery filter itself while coefficients other than those to be used are thinned out. This makes it possible to directly apply the filter to image data with a ¼ size.

In either case, the number of effective coefficients of the filter to be used becomes obviously smaller than that of the image recovery filter shown in FIG. 7A which is applied to an image whose pixels all have all color components R, G, and B and that of the image recovery filter shown in FIG. 8B which is applied to the G component which is not separated. This reduces the load of convolution processing.

Upon performing image recovery processing for each pixel of the image, the image recovery processing unit 111 finishes the processing. Since the OTF changes in accordance with the angle of view (image height) of the optical imaging system even under one image sensing condition, it is preferable to perform the image recovery processing according to the present invention upon changing the OTF for each segmented area of the image in accordance with the image height. It is preferable to scan an image recovery filter on an image while performing convolution processing and to sequentially change the filter for each area. That is, this apparatus executes steps S13 and S14 for each target pixel of each image recovery component.

The image data for which the image recovery processing has been performed by the image recovery processing unit 111 is input to the image processing unit 112. Since the image data for which the image recovery processing has been performed remains in a Bayer arrangement, the other image processing unit 112 performs color interpolation processing for each of three color components held by the image sensor. The other image processing unit 112 generates an image file in JPEG format or the like by performing known developing processing for RAW data, such as gamma correction and color balance control, in addition to the color interpolation processing.

Figure 9A:
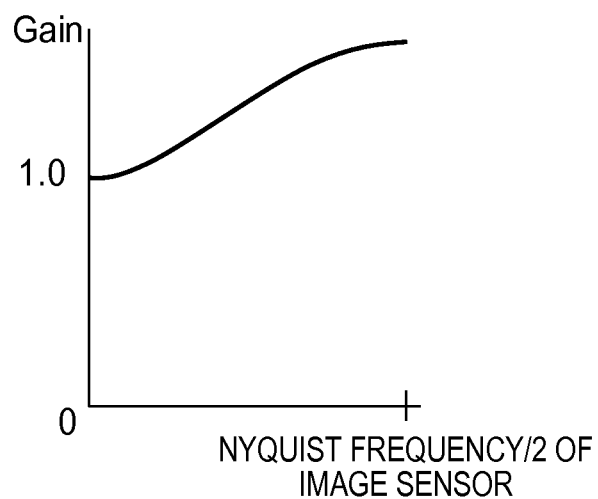
FIGS. 9A and 9B are graphs showing an example of the recovery gain of an image recovery filter and an example of the MTF of an image according to the first embodiment.
Figure 9B:
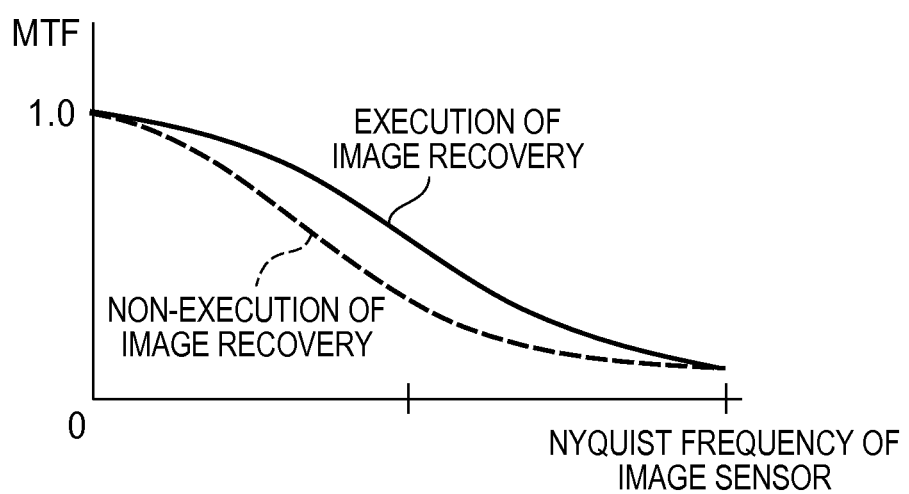

The recovery gain of an image recovery filter and the frequency characteristics of an image based on the execution/non-execution of image recovery processing will be described with reference to FIGS. 9A and 9B. Note that a recovery gain is defined as the amplification factor of an MTF in image recovery processing. The graph shown in FIG. 9A is an example of the recovery gain of an image recovery filter in the first embodiment. According to the spatial frequency characteristics in the above pixel arrangement of image recovery components, it can be thought that the frequency band to be recovered by an image recovery filter is up to ½ the Nyquist frequency of the image sensor. In contrast to this, when performing image recovery processing for each color plane of an image with each pixel having all color components R, G, and B, it can be thought that the frequency band to be recovered by an image recovery filter is up to the Nyquist frequency of the image sensor according to the spatial frequency characteristics in the pixel arrangement of image recovery components.

An improvement in MTF in an output image in the JPEG format or the like having undergone image recovery processing according to the first embodiment is not limited to a band up to ½ the Nyquist frequency of the image sensor. FIG. 9B shows an example of the MTF in an area of an output image according to the first embodiment. Obviously, the MTF has improved even in a band equal to or higher than the Nyquist frequency of the image sensor when image recovery processing is performed as compared with the output image obtained without image recovery processing. This is influenced by the color interpolation processing performed by the other image processing unit 112. Studies have been made on color interpolation processing in an image sensor like that having a Bayer arrangement, and various interpolation techniques have been disclosed. The method generally used is adaptive color interpolation processing of generating an interpolated pixel by using the pixel information of other neighboring color components. This is a method of determining an interpolation method for the component R of a given pixel by using the information of the components G and B of neighboring pixels when generating the pixel value of the component R of the given pixel by interpolation processing. Unlike a method of performing simple linear interpolation of one color component, such adaptive color interpolation processing can suppress the generation of false colors or a degradation in sharpness due to interpolation processing.

Figures 10A, 10B, 10C, 10D, 10E, 10F, 10G, 10H, 10I, 10J, 10K:
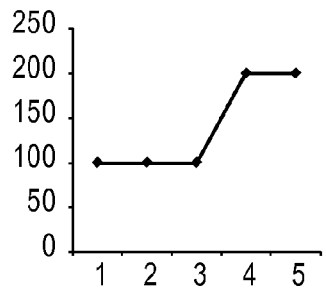
FIGS. 10A to 10K are views showing an example of color interpolation processing according to the first embodiment.

An example of the adaptive color interpolation processing method will be explained below using an example of pixel interpolation at the edge portions shown in FIGS. 10A to 10K. FIG. 10A is a sectional view of a given edge. Assume that the edge is a colorless monochrome portion, and each of color components R, G, and B has a pixel arrangement constituted by pixel values of 100 and 200 as shown in FIG. 10B when the values of the respective color components R, G, and B are acquired by the respective pixels of the image sensor 102. In practice, since the RAW image sensed by the image sensor 102 in a Bayer arrangement has one color component in each pixel, extracting a value for each color component will obtain the pixel arrangements shown in FIG. 10C to 10E. Each pixel represented by a black square in the pixel arrangements of the respective color components shown in FIGS. 10C to 10E is a pixel requiring color interpolation processing. Obviously, in this case, the respective color components after color interpolation processing ideally have the pixel values shown in FIG. 10B. Subsequently, the pixel arrangements shown in FIGS. 10C to 10E are written as G(x, y), R(x, y), and B(x, y), where x represents a coordinate in the horizontal direction and y represents a coordinate in the vertical direction, each of which has a value in the range of 0 to 4 in FIGS. 10A to 10K.

First of all, the following is an example of performing linear interpolation for each color component in FIGS. 10C to 10E. Equation (6) is computed by using four pixels adjacent to a G component when performing linear interpolation for the G component:

$$G(x,y)=(G(x,y-1)+G(x-1,y)+G(x+1,y)+G(x,y+1))/4 \qquad (6)$$

Linear interpolation for an R component is performed by using different patterns depending on the position of the pixel to be interpolated. That is, linear interpolation is performed by using one of the following three patterns represented by equations (7):

If the adjacent left and right pixels have values (for example, R(2, 0)):

$$R(x,y)=(R(x-1,y)+R(x+1,y))/2$$

If the adjacent upper and lower pixels have values (for example, R(1, 1)):

$$R(x,y)=(R(x,y-1)+R(x,y+1))/2$$

If the adjacent oblique pixels have values (for example, R(2, 1)):

$$R(x,y)=(R(x-1,y-1)+R(x+1,y-1))+R(x-1,y+1)+R(x+1, y+1))/4 \qquad (7)$$

This apparatus performs linear interpolation for the B component, in the same manner as for the R component, by applying one of the three patterns represented by equations (7) described above in accordance with the location of the pixel to be interpolated.

FIGS. 10F to 10H show an example of each color component to which the above linear interpolation is applied. The interpolation processing has generated pixel values other than 100 and 200. Obviously, therefore, the sharpness of the pixel values is lower than that of the pixel values shown in FIG. 10B.

The following is an example of the adaptive color interpolation processing of generating interpolated pixels by using the pixel information of other color components around the pixel. This adaptive color interpolation processing will be referred to as "adaptive interpolation" hereinafter. The apparatus performs adaptive interpolation for the G component in the following manner.

When generating a G component of a pixel having a value in an R component (for example, G(1, 2)):

```
H_DIFF = (R(x, y) - R(x-2, y))
       + (R(x, y) - R(x+2, y))
V_DIFF = (R(x, y) - R(x, y-2))
       + (R(x, y) - R(x, y+2))
IF (|H_DIFF| > |V_DIFF|){
  G(x, y) = (G(x, y-1) + G(x, y+1))/2
}
ELSE{
  G(x, y) = (G(x-1, y) + G(x+1, y))/2
}
```

Determining an interpolation direction based on H_DIFF and V_DIFF calculated from the R component in this manner can suppress a degradation in sharpness due to linear interpolation. Although the above description concerns the generation of the G component of the pixel which has a value in the R component, the apparatus can interpolate the G component of a pixel which has a value in the B component (for example, G(2, 1)) in the same manner. As described above, when performing interpolation, the apparatus handles the G component as one color component without separating it into G1 and G2 components, and hence can use the values of more neighboring pixels than when separating the G component into G1 and G2 components. This will improve the MTF in a high frequency band.

The apparatus performs adaptive interpolation for the R component by using the G signal interpolated by the above method, as indicated by equations (8) given below.

If adjacent left and right pixels have values (for example, R(2, 0)):

$$Cr = (R(x-1,y) - G(x-1,y) + R(x+1,y) - G(x+1,y))/2$$

$$R(x,y) = G(x,y) + Cr$$

If adjacent upper and lower pixels have values (for example, R(1, 1)):

$$Cr = (R(x,y-1) - G(x,y-1) + R(x,y+1) - G(x,y+1))/2$$

$$R(x,y) = G(x,y) + Cr$$

If adjacent oblique pixels have values (for example, R(2, 1)):

$$Cr = (R(x-1, y-1) - G(x-1, y-1) + \qquad (8)$$
$$R(x+1, y-1) - G(x+1, y-1) + R(x-1, y+1) -$$
$$G(x-1, y+1) + R(x+1, y+1) - G(x+1, y+1))/4$$
$$R(x, y) = G(x, y) + Cr$$

The apparatus performs adaptive interpolation by interpolating color difference information (R−G) acquired from adjacent pixels in this manner.

The apparatus performs adaptive interpolation for the B component in the same manner as for the R component, by applying one of the three patterns represented by equations (8) described above depending on the location of the pixel to be interpolated, and interpolating color difference information (B−G) acquired from adjacent pixels.

FIGS. 10I to 10K show an example of each color component to which the above adaptive interpolation is applied. The R, G, and B pixel values coincide with each other. Each pixel value coincides with that shown in FIG. 10B. Performing adaptive interpolation to generate an interpolated pixel using pixel information of other neighboring color components can generate an image without any degradation in sharpness with respect to the pixel arrangement shown in FIG. 10B.

As described above, the apparatus applies image recovery processing for each image recovery component with matching frequency bands and then performs adaptive color interpolation processing for each recovered color component, thereby improving the MTF even in a frequency band higher than the frequency band which the pixel arrangement of each color component has. This indicates that the above effect is not limited to one interpolation method, and that the MTF corrected by image recovery processing is maintained up to the Nyquist frequency of an image sensor by color interpolation processing after the image recovery processing, and the amount of MTF improvement is variable depending on the pixel interpolation method used.

The arrangement and processing of the image processing unit 104 to which the present invention is applied have been described above. The first embodiment has exemplified the general Bayer arrangement constituted by R, G, and B components. However, the present invention can be applied to not only the pixel arrangement constituted by color components R, G, and B but also the pixel arrangement constituted by color components of a plurality of colors other than R, G, and B. In addition, the present invention can be applied to various types of pixel arrangements in image sensors. A general Bayer arrangement constituted by R, G, and B components can be expressed as shown in FIG. 11A when being represented by a pixel arrangement pattern without specifying any colors. C1, C2, and C3 each indicate one color component.

In contrast to this, consider a color component arrangement like that shown in FIG. 11B. This is the pixel arrangement of an image sensor constituted by four color components C1, C2, C3, and C4. FIG. 12 shows an example of each color component having this pixel arrangement and each image recovery component obtained by application of the present invention. The C1 component is separated into four image recovery components. The C2 and C3 components are used as image recovery components without any changes. The C4 component is separated into two image recovery components. That is, a pixel with a color component higher in spatial frequency characteristics than other color components is separated into a plurality of color components to have the same spatial frequency characteristics as those of other color components. This makes it possible to perform image recovery processing upon unifying the spatial frequency characteristics of the pixel arrangements of the respective image recovery components.

In this manner, the present invention can be applied to not only a general Bayer arrangement constituted by R, G, and B components but also various types of pixel arrangements constituted by various types of color components. Obviously, each pixel arrangement is not limited to a matrix arrangement. The present invention can be applied to any arrangement that can unify the frequency characteristics of the respective image recovery components by separating a color component of an image sensor.

Second Embodiment

Image recovery processing according to the second embodiment of the present invention will be described below.

Since the basic arrangement of an image capture apparatus according to the second embodiment is the same as that of the first embodiment shown in FIG. 1, a description of it will be omitted.

Figure 13:
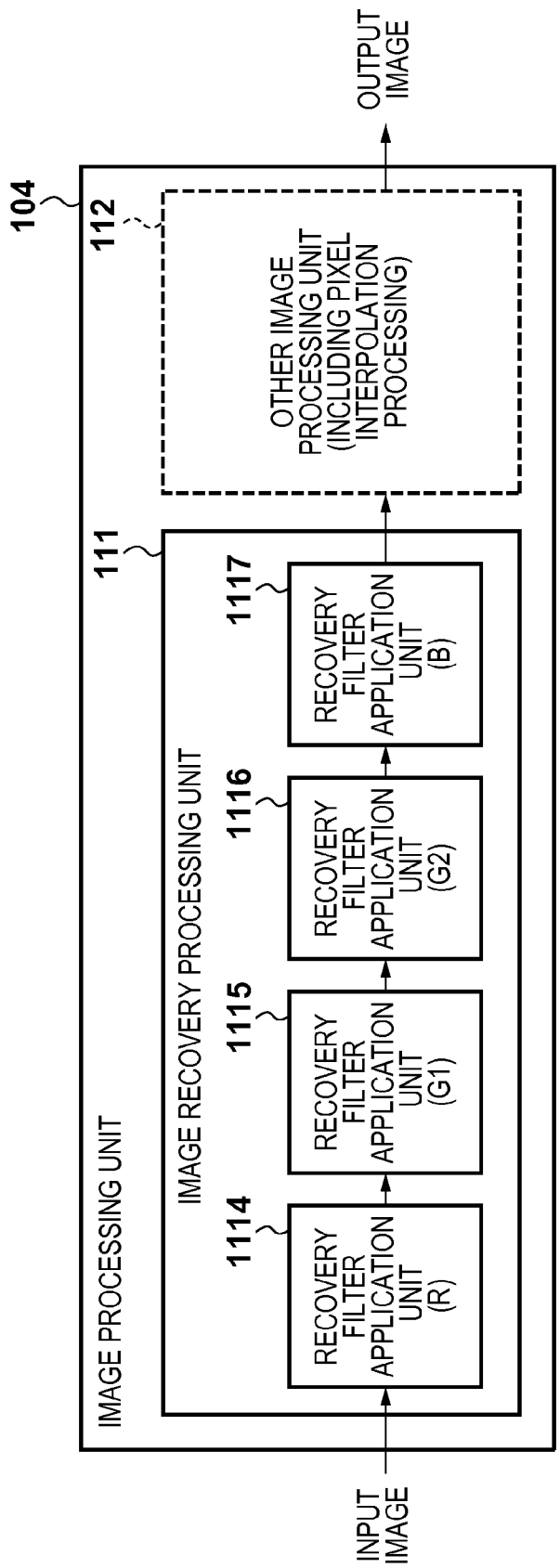
FIG. 13 is a block diagram showing the arrangement of an image processing unit according to a second embodiment.

FIG. 13 shows the arrangement of an image processing unit 104 in the second embodiment. The image input to an image recovery processing unit 111 is RAW data with each pixel having a color component of one color of R, G, and B in the Bayer arrangement shown in FIG. 2. The second embodiment applies an image recovery filter to each input RAW data in a Bayer arrangement without any change and without segmenting the RAW data into image recovery components. Image recovery filters are respectively applied to four image recovery components in recovery filter application units 1114 to 1117 connected in series.

Figure 14:
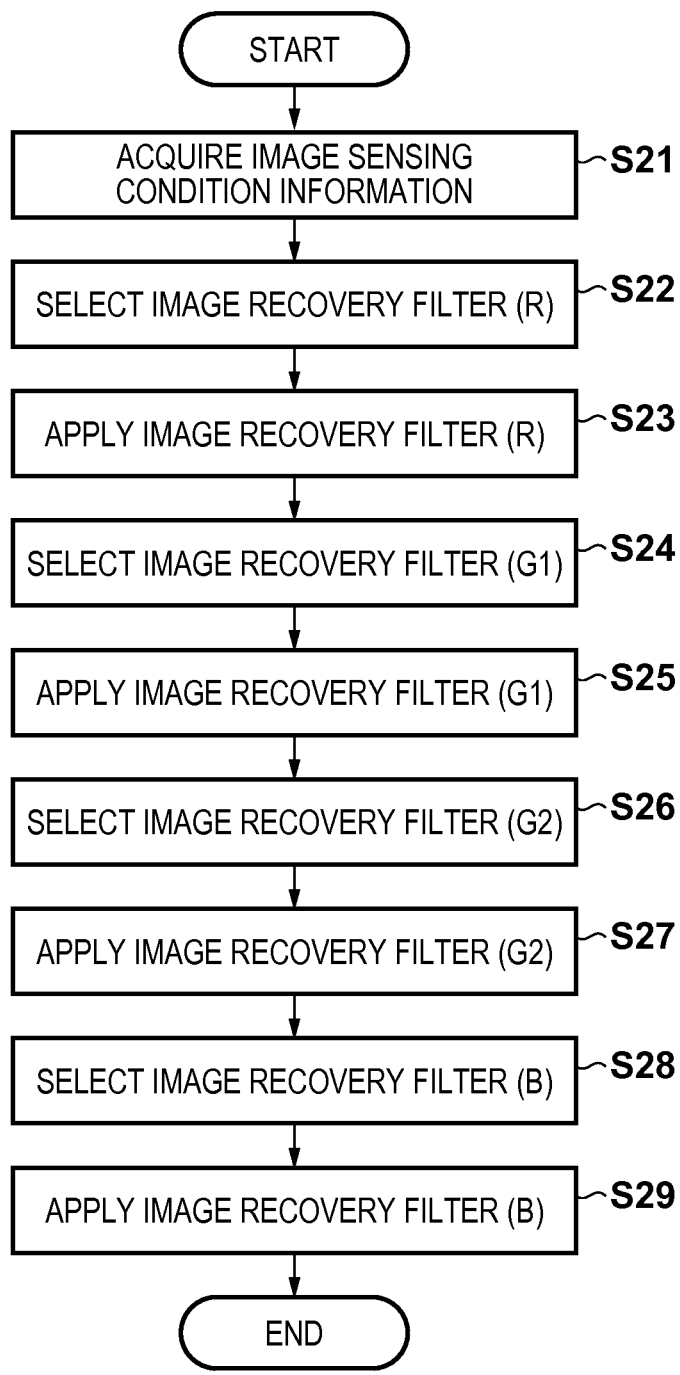
FIG. 14 is a flowchart showing image recovery processing according to the second embodiment.

A procedure for image recovery processing in the second embodiment in the image recovery processing unit 111 will be described in detail below with reference to FIG. 14. In step S21, the image recovery processing unit 111 acquires the information of actual image sensing conditions from a condition detection unit 107, as described above. The image sensing conditions include, for example, a zooming position, aperture diameter, and object distance.

In step S22, an image recovery filter for the R component which is suitable for the acquired image sensing conditions is selected from image recovery filters stored in a storage unit 108 in FIG. 1. At this time, the selected image recovery filter may be corrected as needed. This operation is to correct the image recovery filter prepared in the storage unit 108 in advance by preparing discrete image sensing data in advance and correcting the image recovery filter when actually executing image recovery processing in order to reduce the number of data of the image recovery filter.

In step S23, using the image recovery filter of the R component selected in step S22, the recovery filter application unit 1114 performs convolution processing by filter processing with respect to each pixel of the R component of a sensed input image. This can eliminate or reduce the blur component of the R component of the image due to aberrations caused in the optical imaging system. As described above, using an image recovery filter suitable for each image recovery component can also correct chromatic aberration.

In steps S24 to S29, the apparatus performs image recovery processing for image recovery components of G1, G2, and B. Note that the contents of image recovery processing performed in this case are the same as those in steps S22 and S23 except for color components to be corrected, and hence a description of the processing will be omitted.

The convolution processing for each image recovery component in steps S23, S25, S27, and S29 is convolution processing by filter processing using the respective image recovery components shown in FIGS. 4B to 4E and the image recovery filter shown in FIG. 8A. Limiting pixels subjected to convolution processing to target image recovery components can omit unnecessary computation. Obviously, the number of effective coefficients of an image recovery filter in this case is smaller than that of an image recovery filter applied to an image each pixel having the respective color components of R, G, and B shown in FIG. 7A and that of an image recovery filter applied to the G component (FIG. 8B) which is not separated. This reduces the load of convolution processing. In addition, since RAW data in a Bayer arrangement can be used as an input image without any change, there is no need to ensure the signal separation unit 1101 or any new memory. This can suppress the amount of memory consumed.

Subsequently, the apparatus performs image recovery processing for each pixel of the image, and terminates the processing in the image recovery processing unit 111. Since the OTF changes in accordance with the angle of view (image height) of the optical imaging system even under one image sensing condition, it is preferable to perform the image recovery processing according to the present invention upon changing the OTF for each segmented area of the image in accordance with the image height. It is preferable to scan an image recovery filter on an image while performing convolution processing and to sequentially change the filter for each area. That is, this apparatus executes steps S22 and S23 for each pixel of the R component, and executes steps S24 to S29 for each image recovery component to be processed in the same manner as described above.

Although the first and second embodiments have handled the application of image recovery filters as image recovery processing, it is possible to handle other types of processing such as distortion correction processing, peripheral light amount correction processing, and noise reduction processing before, after, and midway through the procedure of the present invention and handle the resultant procedure as image recovery processing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-187856, filed on Aug. 30, 2011, which is hereby incorporated by reference herein in its entirety.

What is claimed is:

1. An image processing apparatus for performing recovery processing of image data to correct degradation of the quality of an image due to an aberration in an optical imaging system, the image data obtained by sensing an object image entering through the optical imaging system using an image sensor having a plurality of pixels, where each pixel of image sensor is covered with one of a plurality of color filters, the image processing apparatus comprising:
   a separation unit configured to separate image data of the plurality of colors of the color filters into image data of the respective colors of the color filters;
   a plurality of image processing units each configured to perform recovery processing by filter processing image data of one of the respective colors separated by the separation unit; and
   an interpolation processing unit configured to perform color interpolation processing of each pixel for the image data having undergone the recovery processing,
   wherein the separation unit is further configured to separate image data of a color whose spatial frequency characteristic is higher than that of another color, due to an arrangement of the plurality of color filters of the plurality of colors into a plurality of image data of the same color so that the plurality of image data of the same color have the same spatial frequency characteristic as the image data of the another color, and wherein the interpolation processing unit is further configured to perform the color interpolation processing by using the plurality of image data of the same color.

2. The apparatus according to claim 1, wherein the plurality of color filters of the plurality of colors comprise color filters in a Bayer arrangement, and wherein the separation unit is further configured to separate a G component of the image data into image data of two G components so as to make a frequency characteristic of the G component coincide with that of an R component and a B component.

3. The apparatus according to claim 1, wherein a filter used for the filter processing performed by the image processing unit comprising a two-dimensional filter obtained by performing an inverse Fourier transform of a function generated based on an inverse function of an optical transfer function of an optical element of the optical imaging system, and wherein the image processing unit is further configured to perform convolution processing on the filter.

4. An image processing apparatus for performing recovery processing of image data to correct a degradation in image quality due to an aberration in an optical imaging system, the image data obtained by sensing an object image entering through the optical imaging system using an image sensor having a plurality of pixels, where each pixel of the image sensor is covered with one of a plurality of color filters, comprising:

a plurality of image processing units, disposed in series, each configured to perform recovery processing by filter processing for a part of the image data of the plurality of colors; and an interpolation processing unit configured to perform color interpolation processing of each pixel for the image data having undergone the recovery processing, wherein each of the plurality of image processing units is configured to perform the recovery processing for respective image data of each color which has not undergone the recovery processing, and separately handles, as image data of one of a plurality of colors, image data of a color whose spatial frequency characteristic is higher than that of another color, due to an arrangement of the color filters of the plurality of colors, such that the part of image data to be separately handled as a plurality of image data of the same color and processed by the plurality of image processing units has the same frequency characteristic as the image data of the another color, and wherein the interpolation processing unit is further configured to perform the color interpolation processing by using the plurality of image data of the same color.

5. The apparatus according to claim 4, wherein the color filters of the plurality of colors comprise color filters in a Bayer arrangement, and wherein each of the plurality of image processing units further comprises an image processing unit configured to separate a G component of the image data into two G components whose frequency characteristic coincides with that of an R component and a B component of the image data and process the image data of one G component, an image processing unit configured to process the image data of the other G component, an image processing unit configured to process the image data of the R component, and an image processing unit configured to process the image data of the B component.

6. The apparatus according to claim 4, wherein a respective filter is used for the filter processing performed by the plurality of image processing units comprising a two-dimensional filter obtained by inverse Fourier transform of a function generated based on an inverse function of an optical transfer function of an optical element of the optical imaging system, and wherein the plurality of image processing units are further configured to perform convolution processing on the filter.

7. An image processing method for performing recovery processing of image data to correct for a degradation in image quality due to an aberration in an optical imaging system, the image data obtained by sensing an object image entering through the optical imaging system using an image sensor having a plurality of pixels, where each pixel of the image sensor is covered with one of a plurality of color filters of a plurality of colors, the method comprising:

separating image data of the plurality of colors of the plurality of color filters into a plurality of image data of the respective colors;

performing recovery processing by filter processing for each of the separated image data of the respective colors; and performing color interpolation processing of each pixel for the image data having undergone the recovery processing, wherein image data of a color whose spatial frequency characteristic is higher than that of another color, due to the arrangement of color filters of the plurality of colors, is separated into a plurality of image data of the same color so that the plurality of image data of the same color each have the same spatial frequency characteristic as the image data of the another color, and wherein the color interpolation processing is performed by using the plurality of image data of the same color.

8. An image processing method for performing recovery processing of image data to correct for a degradation in image quality due to an aberration in an optical imaging system, with respect to image data obtained by sensing an object image entering through the optical imaging system using an image sensor having a plurality of pixels, where each pixel of the image sensor is covered with one of a plurality of color filters of a plurality of colors, comprising:

sequentially performing recovery processing by filter processing for each part of image data of the respective plurality of colors using a plurality of respective image processing units disposed in series; and performing color interpolation processing of each pixel for the image data having undergone the recovery processing, wherein each of the plurality of image processing units performs the recovery processing with respect to image data of each color which has not undergone the recovery processing, and separately handles, as image data of one of a plurality of colors, image data of a color whose spatial frequency characteristic is higher than that of another color, due to the arrangement of the color filters of the plurality of colors, such that the part of image data separately handled as a plurality of image data of the same color and processed by the plurality of image processing units has the same frequency characteristic as the image data of the another color, and wherein the color interpolation processing is performed by using the plurality of image data of the same color.

9. A non-transitory readable storage medium having stored thereon a program which is executable by an image processing apparatus, the program having program code for realizing an image processing method for performing recovery processing of image data to correct for a degradation in image quality due to an aberration in an optical imaging system, the image data obtained by sensing an object image entering through the optical imaging system using an image sensor having a plurality of pixels, where each pixel of the image sensor is covered with one of a plurality of color filters of a plurality of colors, the method comprising:

- separating image data of the plurality of colors of the plurality of color filters into a plurality of image data of the respective colors;
- performing recovery processing by filter processing for each of the separated image data of the respective colors; and
- performing color interpolation processing of each pixel for the image data having undergone the recovery processing,
- wherein image data of a color whose spatial frequency characteristic is higher than that of another color, due to the arrangement of color filters of the plurality of colors, is separated into a plurality of image data of the same color so that the plurality of image data of the same color each have the same spatial frequency characteristic as the image data of the another color, and
- wherein the color interpolation processing is performed by using the plurality of image data of the same color.

10. A non-transitory readable storage medium having stored thereon a program which is executable by an image processing apparatus, the program having program code for realizing an image processing method for performing recovery processing of image data to correct for a degradation in image quality due to an aberration in an optical imaging system, with respect to image data obtained by sensing an object image entering through the optical imaging system using an image sensor having a plurality of pixels, where each pixel of the image sensor is covered with one of a plurality of color filters of a plurality of colors, the method comprising:

- sequentially performing recovery processing by filter processing for each part of image data of the respective plurality of colors using a plurality of respective image processing units disposed in series; and
- performing color interpolation processing of each pixel for the image data having undergone the recovery processing,
- wherein each of the plurality of image processing units performs the recovery processing with respect to image data of each color which has not undergone the recovery processing, and separately handles, as image data of a plurality of colors, image data of a color whose spatial frequency characteristic is higher than that of another color, due to the arrangement of the color filters of the plurality of colors, such that the part of image data separately handled as a plurality of image data of the same color and processed by the plurality of image processing units has the same frequency characteristic as the image data of the another color, and
- wherein the color interpolation processing is performed by using the plurality of image data of the same color.

11. The apparatus according to claim 1, wherein the interpolation processing unit is further configured to combine the plurality of image data of the same color and to perform the color interpolation processing by using the combined image data.

12. The apparatus according to claim 4, wherein the interpolation processing unit is configured to combine the plurality of image data of the same color and to perform the color interpolation processing by using the combined image data.

* * * * *